United States Patent [19]

Hong

[11] Patent Number: 5,106,513
[45] Date of Patent: Apr. 21, 1992

[54] PROCESS FOR OXIDATION OF MATERIALS IN WATER AT SUPERCRITICAL TEMPERATURES AND SUBCRITICAL PRESSURES

[75] Inventor: Glenn T. Hong, Tewksbury, Mass.
[73] Assignee: Modar, Inc., Houston, Tex.
[21] Appl. No.: 706,219
[22] Filed: May 28, 1991

Related U.S. Application Data

[63] Continuation of Ser. No. 472,766, Jan. 31, 1990, abandoned.

[51] Int. Cl.$^5$ .............................................. C02F 1/72
[52] U.S. Cl. ........................... 210/759; 210/749; 210/758; 210/760; 210/761; 210/808
[58] Field of Search ............ 210/737, 747, 758, 759, 210/760, 761, 777, 808, 749

[56] References Cited

U.S. PATENT DOCUMENTS

| | | | |
|---|---|---|---|
| 2,665,249 | 1/1954 | Zimmerman | 210/761 |
| 2,735,265 | 2/1956 | Eastman | 60/39.464 |
| 2,944,396 | 7/1960 | Barton et al. | 60/39.05 |
| 3,207,572 | 9/1965 | Saul | 423/204 |
| 3,442,798 | 5/1969 | Schoeffel | 210/663 |
| 3,449,247 | 6/1969 | Bauer | 210/747 |
| 3,626,874 | 12/1971 | Grant | 110/222 |
| 3,761,409 | 9/1973 | McCoy et al. | 210/761 |
| 3,804,756 | 4/1974 | Callahan et al. | 210/763 |
| 3,876,497 | 4/1975 | Hoffman | 162/189 |
| 3,876,536 | 4/1975 | Pradt et al. | 210/609 |
| 3,920,506 | 11/1975 | Morgan | 162/31 |
| 3,977,966 | 8/1976 | Pradt et al. | 210/761 |
| 3,984,311 | 10/1976 | Diesen et al. | 210/753 |
| 4,000,068 | 12/1976 | Nelson | 210/721 |
| 4,010,098 | 3/1977 | Fassell | 210/609 |
| 4,013,560 | 3/1977 | Pradt | 210/198.1 |
| 4,061,566 | 12/1977 | Modell | 210/673 |
| 4,100,730 | 7/1978 | Pradt | 60/39.05 |
| 4,113,446 | 12/1978 | Modell | 48/202 |
| 4,141,829 | 2/1979 | Thiel et al. | 210/762 |
| 4,145,283 | 3/1979 | Topp | 210/761 |
| 4,155,848 | 5/1979 | Sato | 210/761 |
| 4,174,280 | 11/1979 | Pradt | 210/758 |
| 4,191,012 | 3/1980 | Stoddard | 60/39.05 |
| 4,212,735 | 7/1980 | Miller | 210/63 |
| 4,241,722 | 12/1980 | Dickinson | 126/263 |
| 4,272,383 | 6/1981 | McGrew | 210/149 |
| 4,284,015 | 8/1981 | Dickinson | 110/347 |
| 4,292,953 | 10/1981 | Dickinson | 126/263 |
| 4,338,199 | 7/1982 | Model | 210/721 |
| 4,380,960 | 4/1983 | Dickinson | 110/347 |
| 4,543,190 | 9/1985 | Modell | 210/721 |
| 4,564,458 | 1/1986 | Burleson | 210/747 |
| 4,594,164 | 6/1986 | Titmas | 210/741 |
| 4,774,006 | 9/1988 | Kaufmann | 210/742 |
| 4,792,408 | 12/1988 | Titmas | 210/170 |
| 4,822,497 | 4/1989 | Hong et al. | 210/721 |

FOREIGN PATENT DOCUMENTS 584671  9/1947  United Kingdom .

OTHER PUBLICATIONS

Wightman, "Studies in Supercritical Wet Air Oxidation," Master Thesis, Univ. of California, Berkley, Mar. 1981.
New Waste Disposal Process, Chemical Engineering, Aug. 25, 1958.
Operation of the Zimpro Wet Air Oxidation Unit, Zimpro Technical Bulletin, 1964.
Wet Oxidation Boiler-Incinerator, by Louis A. Pradt, Zimpro Inc., CA0924027864W.
Wet Air Oxidation, Chemical Engineering Process (vol. 60, No. 1) Jan. 1964.
Report for the Office of Research and Technology, May 9, 1974 by Gerald Fishbeck et al., Univ. of Delaware on the WAO Process (PBO245,266).
Excerpts from Love Canal Proposal by Modar, Inc.

Primary Examiner—Robert A. Dawson
Assistant Examiner—David Reifsnyder
Attorney, Agent, or Firm—Pravel, Gambrell, Hewitt, Kimball & Krieger

[57] ABSTRACT

Disclosed is a method of oxidizing materials in the presence of an oxidant and water at supercritical temperatures to obtain useful energy and/or more desirable materials. Pressures between 25 and 220 bar are employed. The use of appropriately high temperatures results in a single fluid phase reactor, rapid reaction rates, high efficiency oxidation, and precipitation of inorganic materials.

25 Claims, 4 Drawing Sheets

PROCESS FOR OXIDATION OF MATERIALS IN WATER AT SUPERCRITICAL TEMPERATURES AND SUBCRITICAL PRESSURES

This is a continuation of application Ser. No. 472,766 filed Jan. 31, 1990, now abandoned.

FIELD OF THE INVENTION

This invention relates to the oxidation of materials in aqueous feed streams. More specifically, it relates to a process of completely oxidizing materials in an aqueous feed stream at supercritical temperatures and subcritical pressures, in reference to pure water.

BACKGROUND OF THE INVENTION

The process of wet oxidation has been used for the treatment of aqueous streams for over thirty years. It involves the addition of an oxidizing agent, typically air or oxygen, to an aqueous stream at elevated temperatures and pressures, with the resultant "combustion" of oxidizable materials directly within the aqueous phase. The wet oxidation process is characterized by operating pressures of 30 to 250 bar (440 to 3630 psia) and operating temperatures of 150° to 370° C. Reaction is primarily carried out in the liquid phase since gas phase oxidation is quite slow. Thus, the reactor operating pressure is typically maintained at or above the saturated water vapor pressure, so that at least part of the water is present in liquid form.

Wet oxidation is applicable to streams with a chemical oxygen demand (COD) as low as 20 grams/liter (Perkow, H., R. Steiner and H. Vollmuller, "Wet Air Oxidation - A Review", *German Chemical Engineering*, 1981, 4, 193-201). Below this level energy inputs to the process are excessive, and other technologies such as biological treatment or carbon adsorption become more economical. The advantages of wet oxidation over biological treatment and adsorption are reduced time and space requirements for treatment, destruction of chemicals toxic to microorganisms, destruction of non-biodegradable chemicals, and potential recovery or inorganic materials. The upper limit of wet oxidation applicability is set by the temperature rise due to reaction, and is about 200 grams/liter of utilized chemical oxygen demand (COD). For wastes with higher heating values, incineration becomes a more attractive disposal alternative. When applicable, advantages of wet oxidation over conventional combustion include energy efficiency (evaporation of the process water is not required) and easier handling of inorganic constituents. Typically, the amount of oxidant required by the COD of the waste exceeds the solubility limit of oxygen or air, so that both gaseous and liquid phases are present in the reactor. Because oxidation is carried out primarily in the liquid phase, some provision for mixing must be made to facilitate transfer of oxygen to the liquid phase. Bubble columns, baffles, packed beds and stirrers have been used to achieve this goal.

The largest single application of wet oxidation is for the conditioning of municipal sludge. The COD reduction in this process is only 5 to 15%, the primary objective being sterilization and disruption of the organic matrix to improve the dewatering properties of the sludge. Following wet oxidation, the sludge is used for soil improvement or landfill, or is incinerated. Other uses of wet oxidation are for the treatment of night soil, pulp and paper mill effluents, regeneration of activated carbon, and treatment of chemical plant effluents. In these applications, COD removal is typically 90% or less Wet oxidation is limited not only in the degree of oxidation achievable, but also by its inability to handle refractory compounds. Because of the low temperatures relative to those found in normal combustion, reaction times are on the order of an hour, rather than seconds. Even with these extended reaction times many refractory organics are poorly oxidized. One means for improving the low temperature oxidation has been the usage of homogeneous or heterogeneous catalysts in the liquid stream. The process is significantly complicated by this approach because of catalyst deactivation, attrition, and recovery. The low temperatures of the wet oxidation process also limit its usefulness for power recovery Barton, et al. (U.S. Pat. 2,944,396) in 1960 proposed adding a second stage of oxidation to wet oxidation processes, in order to overcome some of these drawbacks. In this patent, the unoxidized volatile combustibles which accumulate in the vapor phase of a wet oxidation reactor are conducted to a second reactor in order to complete their oxidation. In contrast to conventional wet oxidation conditions, the temperature in this second reactor is allowed to exceed the critical temperature of water of 374° C. It thus becomes possible to produce a high enthalpy stream suitable for power generation, as well as to oxidize certain volatile compounds, such as acetic acid, which are refractory under normal wet oxidation conditions. Catalysts are frequently used in this process. While the process may be advantageous in the context of a wet oxidation plant, as a stand-alone process the Barton invention is of limited utility because its usefulness is constrained to clean, volatile fuels. Such materials are too expensive for power generation on a large scale, and when occurring as a waste stream, are more economically treated by other means. The limited usefulness of the Barton process appears to be indicated by the lack of literature reports on commercial application.

In 1981, Dickinson (U.S. Pat. No. 4,292,953) proposed a modified wet oxidation process for power generation from coal and other slurry fuels in which, as heat is liberated by combustion, the entire reaction mixture exceeds the critical temperature (374° C.) of water. The higher temperature would result in accelerated reaction rates, allowing shorter residence times and smaller reactors as compared to conventional wet oxidation Dickinson's process teaches a process range of between 1000 and 10,000 psi, which covers the range both above and below the critical pressure of water (3206 psi or 221 bar). In the Dickinson process, the reaction commences at subcritical temperatures so that, similar to wet oxidation, the bulk of the oxidizing gas is found in a separate phase above the aqueous slurry. This feature results in a slow reaction initiation and a requirement for prolonged residence time in the reactor, though some improvement over conventional wet oxidation would be expected. To bring the reaction initiation to a higher rate, Dickinson proposed the use of alkali catalyst In U.S Pat. No. 4,388,199, Modell introduced the concept which is referred to as supercritical water oxidation. This process requires the use of supercritical pressures and temperatures, and oxidation is initiated at supercritical conditions. As a result, virtually the entire reaction occurs at an unexpectedly high rate. The use of liquid, solid or gaseous fuels is contemplated in this invention. The process has been successfully applied to a wide range of liquid organics on an experimental and pilot scale, with virtually complete destruction in less than a minute of residence time. Destruction efficiencies of 99.9999% are readily attained, making the process useful for the destruction of toxic and hazardous combustable wastes. In the supercritical water oxidation process, as compared to wet oxidation, a higher temperature rise due to reaction is tolerable, allowing the use of feeds with 300 grams/liter or more of COD. This is equivalent to a maximum feed fuel value of about 4650 kJ/kg (2000 Btu/lb.). Use of feed blending or regenerative heat exchange allows the treatment of streams with a wide range of fuel values. Alkali catalyst is not required in the supercritical water oxidation process.

In U.S. Pat. No. 4,380,960, Dickinson added the feature of high temperature initiation to the process. In this patent, several means of preheating the slurry feed are taught, and examples are given of embodiments in which the slurry is brought to supercritical temperature (and optionally supercritical pressure) at the inlet of the reactor. To allow reaction initiation in a vapor or supercritical fluid phase, rather than in a dense liquid phase as with wet oxidation, Dickinson taught the need for an alkali catalyst.

There are a number of patents for wet oxidation type processes carried out with a deep well reactor configuration. An advantage of this mode operation is that some of the requisite high pressure is generated by a column of fluid, allowing the use of relatively low pressure pumps and compressors. Representative of conventional wet oxidation, i.e., subcritical temperature and pressure, are Bauer (U.S. Pat. No. 3,449,247), McGrew (U.S. Pat. No. 4,272,383) and Kaufmann (U.S. Pat. No. 4,774,006). Kaufmann also extends the patent teachings to supercritical conditions. There are several other patents disclosing the use of supercritical water for oxidation with a deep well reactor configuration, for example, Burleson (U.S. Pat. No. 4,564,458), Titmas (U.S. Pat. No. 4,594,164) and Titmas (U.S. Pat. No. 4,792,408).

In addition to higher temperatures and hence reaction rates, much of the benefit of extending wet oxidation to supercritical conditions derives from the phase behavior in this region. Oxygen and many gaseous, liquid and solid combustibles are completely miscible with supercritical water, allowing intimate mixing of reactants in the aqueous phase. Mass transfer resistances due to the bulk separation of oxidant and fuel are not a concern, and open tubular or vessel reactors may be used. It is also found that, in the supercritical region, solubility of many inorganics is quite low. An important example is sodium chloride, which has a solubility as low as 150 mg/kg above 450° C. at 250 bar. Thus, it is possible to purify the high temperature, high pressure aqueous stream of many inorganic materials normally considered highly water soluble by using an appropriate solids separation scheme. This fact is important because it is conceivable that upon removing the inorganics, the supercritical water stream may be directly used for power generation. Such a power cycle has an inherent advantage over conventional stream power cycles in that the heat of combustion need not be transferred across boiler tube walls to reach the working fluid. The mode of operation is analogous to a gas turbine, in which the combustion medium is also the working fluid. Unlike a gas turbine, however, dirty or wet fuels, such as coal or wood refuse, may be used. It is also to be noted that the operating pressure and temperature of the supercritical water oxidation process are similar to and compatible with current-day supercritical steam (water) power cycles. Plants with supercritical steam power cycles have been in operation for several decades.

Compared to wet oxidation, the greatly reduced residence time possible with supercritical water oxidation allows the use of considerably smaller reactors. Furthermore, the higher operating temperature permits more efficient recovery of the heat of reaction and potentially simplifies the schemes for solids removal. On the other hand, the higher temperature and pressure of operation require the use of more exotic construction materials, heavier schedule pipe, and greater compression and pumping costs. The fact that supercritical water oxidation operates in a region where corrosion phenomena have not fully been investigated further adds to the burden of materials selection. While the bulk of inorganic solids are removed via precipitation, the process stream may still contain a certain amount of dissolved solids, and the direct feeding of this stream to a turbine will require some development effort. In addition, the art of supercritical pressure steam power generation is less highly developed than that of subcritical pressure steam power generation. Consequently, there is still a need in the industry for a process that has the advantages of supercritical water oxidation without the disadvantages associated with supercritical pressure.

SUMMARY OF THE INVENTION

Aqueous feed streams containing organic or inorganic combustible materials, such as coal, sewage and toxic chemicals, may be substantially completely oxidized in a rapid, self-sustaining reaction without a catalyst. The conditions of this reaction may be generally characterized as supercritical temperatures and subcritical pressures for water. Supercritical temperatures for complete oxidation range from 500°–800° C., depending on the fuel used. Pressures are in the subcritical range of from about 25 bar to 220 bar. The process typically provides virtually complete oxidation of the aqueous feed stream in a residence time of less than 5 minutes, preferably less than about 0.5 minutes.

BRIEF DESCRIPTION OF THE DRAWINGS

The theoretical basis for the invention and its preferred embodiments will best be understood by reference to the attached drawings, which are listed below:

FIG. 3 shows an embodiment of the present invention for oxidizing a dilute aqueous stream;

DESCRIPTION OF THE INVENTION

Figure 1:
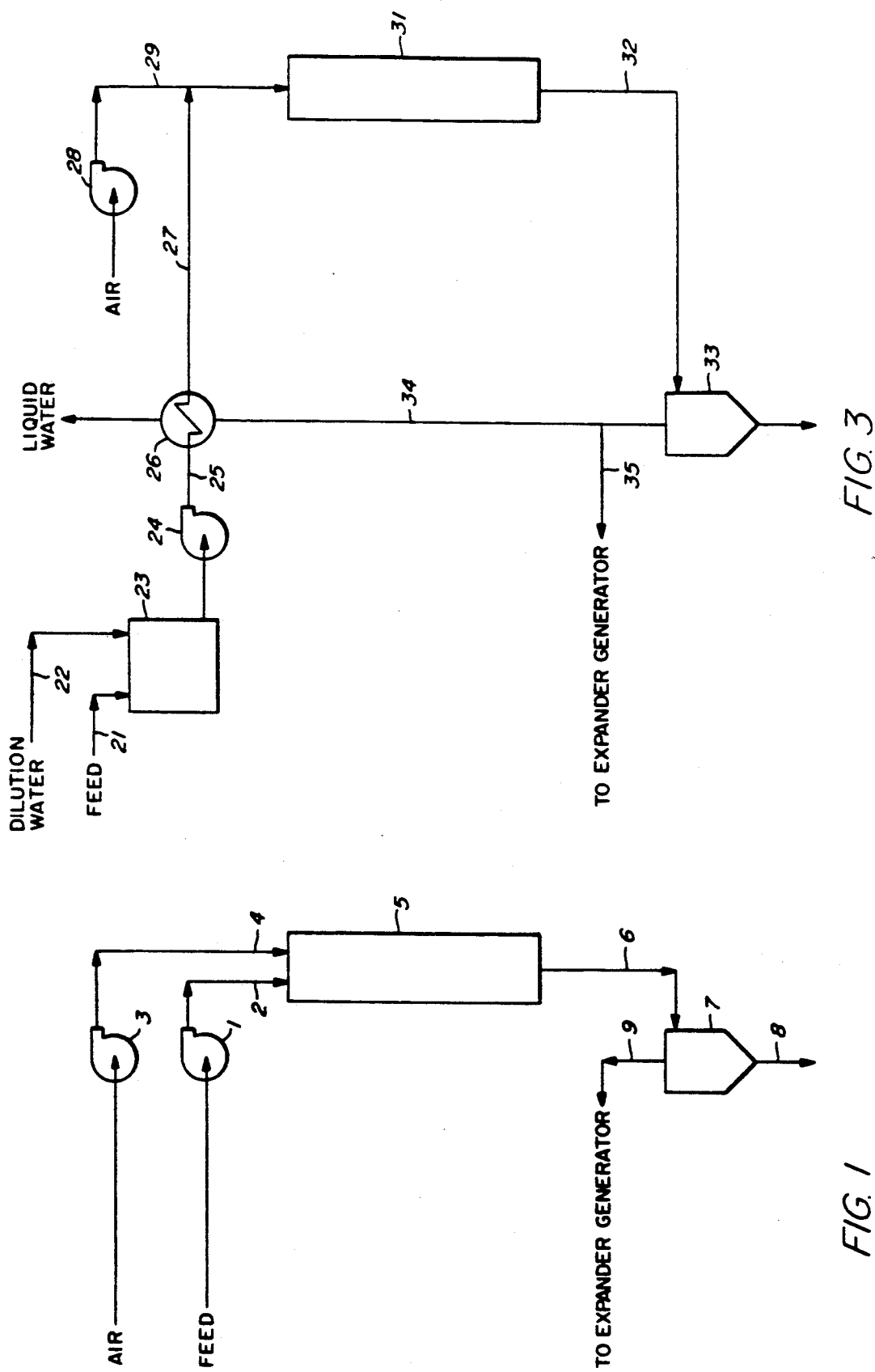
FIG. 1 shows an embodiment of the present invention for oxidizing a concentrated aqueous stream.

It has now been found that whole streams of aqueous mixtures may be substantially completely oxidized in a rapid, self-sustaining reaction at conditions for water which are supercritical in temperature but subcritical in pressure, without the need for a catalyst. This process, which will be referred to as supercritical temperature water oxidation, has a destruction efficiency greater than about 95.0%, preferably greater than about 99.0%. Such a process is complementary to the previously described process of supercritical water oxidation, but for certain feed streams, the supercritical temperature water oxidation will be preferred over the supercritical water oxidation process. Supercritical temperatures are required in supercritical temperature water oxidation to achieve high reaction rates, preferred temperatures for complete oxidation being between about 500°-800° C. The useful lower limit of pressure for supercritical temperature water oxidation will depend on the particular material being oxidized and its concentration in the aqueous stream. For combustion in air at atmospheric pressure, for example, it is known that the ignition temperature (the lowest temperature for self-sustaining combustion) for different materials varies widely, e.g., 650° C. for methane compared to 300° C. for gasoline. Increasing pressure typically decreases ignition temperature for a given material in near-ambient pressure combustion. These principles should apply as well to reaction in a pressurized steam environment, although ignition temperatures are not well-known due to the preponderance of water. For materials which are difficult to ignite, higher pressures will be required, while for easily ignited materials lower pressures will prove satisfactory. Increasing pressure serves to increase reactant concentration (moles per liter) and thereby may enable self-sustaining reaction for streams with a low fraction of combustible material. Pressures as low as approximately 25 bar (360 psi) are expected to be useful for the supercritical temperature water oxidation process.

Supercritical temperature water oxidation and supercritical water oxidation have many similarities. Both processes operate at similar temperatures. In both processes, gases and nonsolid combustibles are completely miscible in the aqueous phase, allowing intimate reactant contact and high reaction rates. For a given feed, the choice between operating at subcritical or supercritical pressure will not usually depend on the extent of reaction attainable. More typically, it will depend on the behavior of inorganic compounds within the reactor. These inorganics are introduced as feed constituents or generated as reaction products. At a given temperature inorganics such as salts or metal oxides will typically have a lower solubility at subcritical as compared to supercritical pressures, allowing the recovery of a cleaner liquid product with supercritical temperature water oxidation. Aside from this quantitative difference, it has also been discovered that there exists for some feeds a qualitative difference in salt behavior. U.S. Pat. No. 4,338,199 to Modell has previously taught that temperatures in excess of 450° C. are useful for precipitating solid salts. While these conditions are frequently useful, it is also found in many cases that subcritical pressures are required or preferred to precipitate salts exclusively as solids rather than as dense brines or mixtures of particulates and dense brine. Important examples include potassium chloride, many bromide and iodide salts, and many salt mixtures, for example, sodium chloride/sodium carbonate and sodium chloride/sodium sulfate. Formation of solids rather than brines can be crucial to the operation of certain separation devices, e.g., filters. Moreover, the highly corrosive nature of many dense brines is frequently a reason to prefer the precipitation of salts as a solid phase.

On the other hand, in some applications separation of a brine rather than a solid may be desirable. Pressures below critical can allow separation of fluid phases which are completely miscible at supercritical conditions because for a given temperature at elevated pressures, the vapor-liquid envelope of salt water systems typically broadens as pressure is decreased over a substantial range. For example, a 5 wt. % solution of salt may exist as a single fluid phase at 600° C. and 250 bar, but split into vapor and liquid phases at 600° C. and 150 bar. This liquid phase is typically highly concentrated in salt, while the vapor phase has a very low salt content. Separating the phases thus allows an effective desalination of the process stream. Separation of the liquid and vapor phases may be carried out by conventional means, e.g., gravity settling, cyclonic action, or mist extraction.

In certain cases, the use of subcritical pressures may have other advantages over the use of supercritical pressures. While supercritical water oxidation requires a thicker walled vessel due to higher operating pressure, the less dense process stream in supercritical temperature water oxidation necessitates a larger vessel to achieve a comparable residence time. Thus, reactor costs may be roughly equivalent for the two schemes. In other portions of the plant, however, capital and operating expenses will be reduced by the lower pressures utilized with supercritical temperature water oxidation. Because dissolved solids in the supercritical temperature water oxidation process effluent will be lower, this stream becomes more useful for power or heat recovery, or recycling. The less extreme pressure should also make it easier to adapt supercritical temperature water oxidation to power recovery. If power is not recovered, the process effluent from supercritical temperature water oxidation is frequently more compatible with the requirements for generating plant or process steam.

The present invention may also be applied in a deep well reactor configuration. With the combination of supercritical temperature but subcritical pressure, it represents an improvement in that short residence times may be used in relatively shallow wells.

EXAMPLE 1

FIG. 1 depicts an embodiment of the invention useful for the generation of power or high pressure steam from coal. For a cold startup, the system is brought to operating conditions using an auxiliary furnace. The furnace is used to produce steam, which is run through the system to provide heatup. Mass flows and temperatures during normal operation are given in Table 1.

TABLE 1

Mass flows and temperatures for the pressurized steam oxidation of a 13 wt. % aqueous coal slurry. Coal heating value has been approximated at 30,000 kJ/kg (13,000 Btu/lb.). System pressure = 200 bar.

| Stream | T (°C.) | $H_2O$ | $O_2$ | $N_2$ | $CO_2$ | Coal | Sulfates + Ash | Total |
|---|---|---|---|---|---|---|---|---|
| 2 | 25 | 87.0 | — | — | — | 13.0 | — | 100.0 |
| 4 | 100 | — | 34.0 | 128.0 | — | — | — | 162.0 |
| 6 | 563 | 93.2 | 3.1 | 128.2 | 35.8 | — | 1.8 | 262.0 |
| 8 | 563 | — | — | — | — | — | 1.8 | 1.8 |
| 9 | 563 | 93.2 | 3.1 | 128.2 | 35.8 | — | — | 260.2 |

A 13 wt. % slurry of pulverized coal is brought to pressure by slurry pump 1, and enters the vessel reactor 5. An air stream which was pressurized by compressor 3 enters the reactor separately. The multiphase mixture is rapidly brought to reacting conditions by mixing with a portion of the reactor contents. Particulate ash will precipitate in the reactor as the coal is combusted. As a result of the oxidation reaction, reduced sulfur in the coal is converted to sulfate anion, which only partially pairs with cations available in the native coal. The surplus sulfate is present as sulfuric acid, which, depending upon concentration, can lead to accelerated corrosion within the reactor or equipment further downstream. For this reason, a cation supplier such as sodium hydroxide may be added to the feed before it is pressurized, or directly to the reactor to allow the precipitation of sodium sulfate within the reactor (not shown in FIG. 1). On the other hand, it is sometimes preferable to allow relatively low levels of acid to pass through the reactor and cooling section to avoid increased solids precipitation. Depending upon effluent requirements, neutralization may then be carried out on the cool effluent liquid. The reactor 5 may be designed to allow for simultaneous combustion and solids removal as per U.S. Pat. No. 4,822,497 assigned to MODAR, Inc. FIG. 1 shows the alternative of a discrete solids separator 7, which may be a settling column, cyclone, filter or equivalent device. Dry solids are removed from the solids separator via stream 8, while the entire fluid portion of the reactor effluent passes to an expander-generator for power and/or heat recovery. Note that in generating power by this scheme, heat is transferred to the working fluid without the intervention of heat transfer surfaces In addition to inherent efficiency, the traditional problems of scaling and hot spots on heat transfer surfaces has been avoided. Because of the solids removal step at 7 and the intimate contact of gas and liquid streams during pressure/temperature letdown, another benefit of this scheme is that scrubbing of off-gases, even for "dirty" fuels, is not required. Furthermore, the temperatures attained in the supercritical temperature water oxidation reactor are considerably lower than those associated with conventional combustion processes, and $NO_x$ and $SO_2$ gases are formed only in negligible amounts.

In this example a 13 wt. % coal slurry is sufficient to heat the incoming slurry from ambient to a reactor temperature of 563° C. If a higher reactor temperature were found to be more desirable, a number of alternatives would be available:

(1) increase the slurry fuel fraction by adding coal water;

(2) add a supplemental fuel, for example, waste oil or solvents;

(3) heat the feed stream by using regenerative heat exchange with some or all of the reactor effluent; or (4) heat the feed stream or reactor with an external heat source, e.g., a natural gas burner or steam.

Conversely, if a lower reactor temperature were found more desirable, the following alternatives could be considered:

(1) add dilution water or other dilute stream to the feed stream or reactor; or (2) cool the reactor.

Using these methods, it will usually be possible to match the heating value of a wide variety of wastes or other feeds to the desired reactor temperature. The process configuration of FIG. 1 is particularly suited to feeds with a relatively high fuel content, in the range of 4200 kJ/kg (1800 Btu/lb.).

EXAMPLE 2

Figure 2:
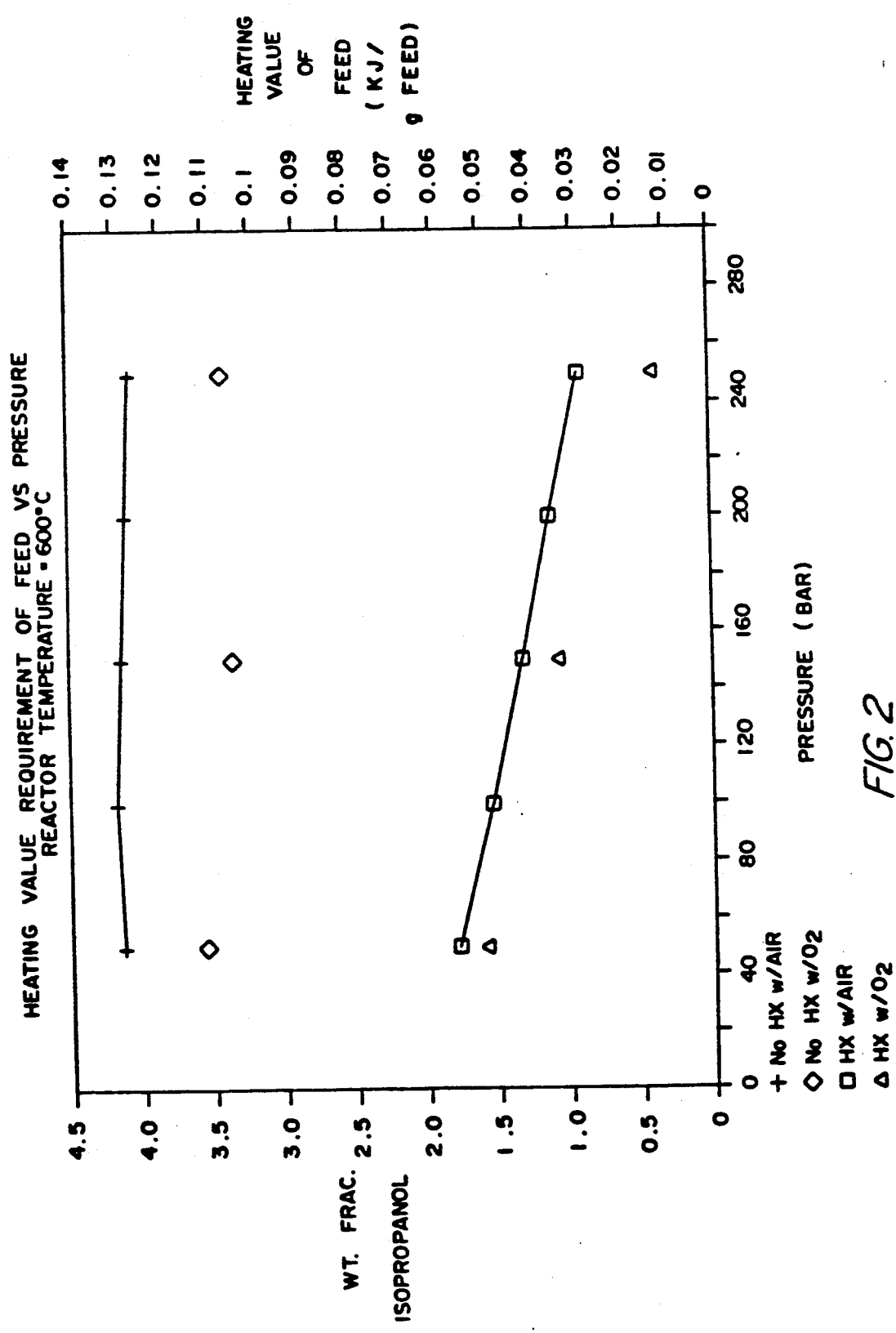
FIG. 2 shows how the feed heating value required for supercritical temperature water oxidation varies with operating pressure.

Computer process simulation was carried out to explore the effect of operating pressure on the feed heating value requirement to achieve a 600° C. reactor temperature. FIG. 2 shows two sets of curves defining this relationship, with heating value on the vertical axis. Pressure is shown on the horizontal axis.

The upper set of curves shows the adiabatic heating value requirement when no preheating of the cold feed is carried out. Such a flow scheme was considered in Example 1 above, and illustrated in FIG. 1. With air as the oxidant, the required heating value is about 4.2 kJ/g, while with pure oxygen as the oxidant the required heating value is reduced to about 3.5 kJ/g. The heating value is reduced with oxygen because there is no need to heat the nitrogen component of air. For either oxidant, required heating value is roughly constant with pressure from 50 bar up to the supercritical pressure of 250 bar.

The lower set of curves pertains to the case in which incoming feed is heat exchanged with reactor effluent. This process configuration is particularly suited to feeds with relatively low fuel value, in the range of 1 kJ/g. With such regenerative heat exchange, required heating value is no longer pressure independent. This is a result of the presence of noncondensible gases in the hot stream, which make it more difficult to condense water vapor and recycle this heat of condensation. As higher pressures facilitate water condensation, heat recovery is more efficient and higher preheat temperatures are attainable. Thus, at 250 bar with pure oxygen as the oxidant, feed with an isopropanol content of about 1 wt. % is suitable. At 50 bar, by contrast, an isopropanol content of nearly 5 wt. % is required.

A process scheme utilizing regenerative heat exchange is depicted in FIG. 3. The waste stream 21 is mixed with dilution water 22 in feed reservoir 23, the purpose of the dilution water being to attain the appropriate temperature rise within the reactor. This step would be omitted if the feed material already had a suitably low heating value. The mixed stream is brought up to system pressure by pump 24, and then passed to heat exchanger 26. In the heat exchanger the aqueous feed stream is heated to a temperature sufficient to guarantee both complete miscibility with air and the attainment of the desired temperature at the reactor exit. Frequently, the temperature of stream 27 will be high enough to cause organic molecules to pyrolyze or reform. Note that the hot stream passing through the heat exchanger 26 is a portion of the reactor effluent.

Oxidant for the process is provided by ambient air, brought to system pressure by compressor 28. Oxidant is provided in stoichiometric or greater quantity to allow for complete combustion. The compressed air, stream 29, is mixed with the preheated aqueous stream 27, and then enters the open tubular reactor 31. The heat of combustion raises the fluid to an appropriate temperature at the reactor exit. Upon leaving the reactor, the effluent stream 32 enters a solids separator 33, if necessary, and is split into two portions—stream 34 passes through the heat exchanger 26 to provide preheating, while stream 35 is directed to an expander-generator for power recovery or else for use as process steam.

With the open pipe reactor of FIG. 3, the preheating step must provide for kindling of the reaction by heating the feed to a temperature at which air is completely miscible, and at which oxidative reaction will commence as soon as air is introduced. This is because little backmixing of fluid occurs within the reactor. This feature also makes plug flow reactors favored in cases where high oxidation efficiency of the feed material must be assured. As illustrated in Example 1, in cases where feed is more concentrated and the reactor is designed to allow some backmixing of fluid and reaction intermediates, it is possible to dispense with the preheating step. The scheme of FIG. 1 is also preferable for feeds which may cause scaling in preheat exchangers.

Recycle of hot reactor effluent to the reactor inlet, by means of a pump or eductor, has been shown in the prior art as a means of attaining rapid reaction initiation. This useful technique for providing rapid heatup of incoming feeds is not shown in FIG. 3 because an energy balance will readily show that the feed fuel value requirement for achieving a given reactor temperature is not affected. The feature of FIG. 3 which makes it suitable for low fuel value feeds is the recycling of heat without the recycling of mass.

EXAMPLE 3

Figure 4:
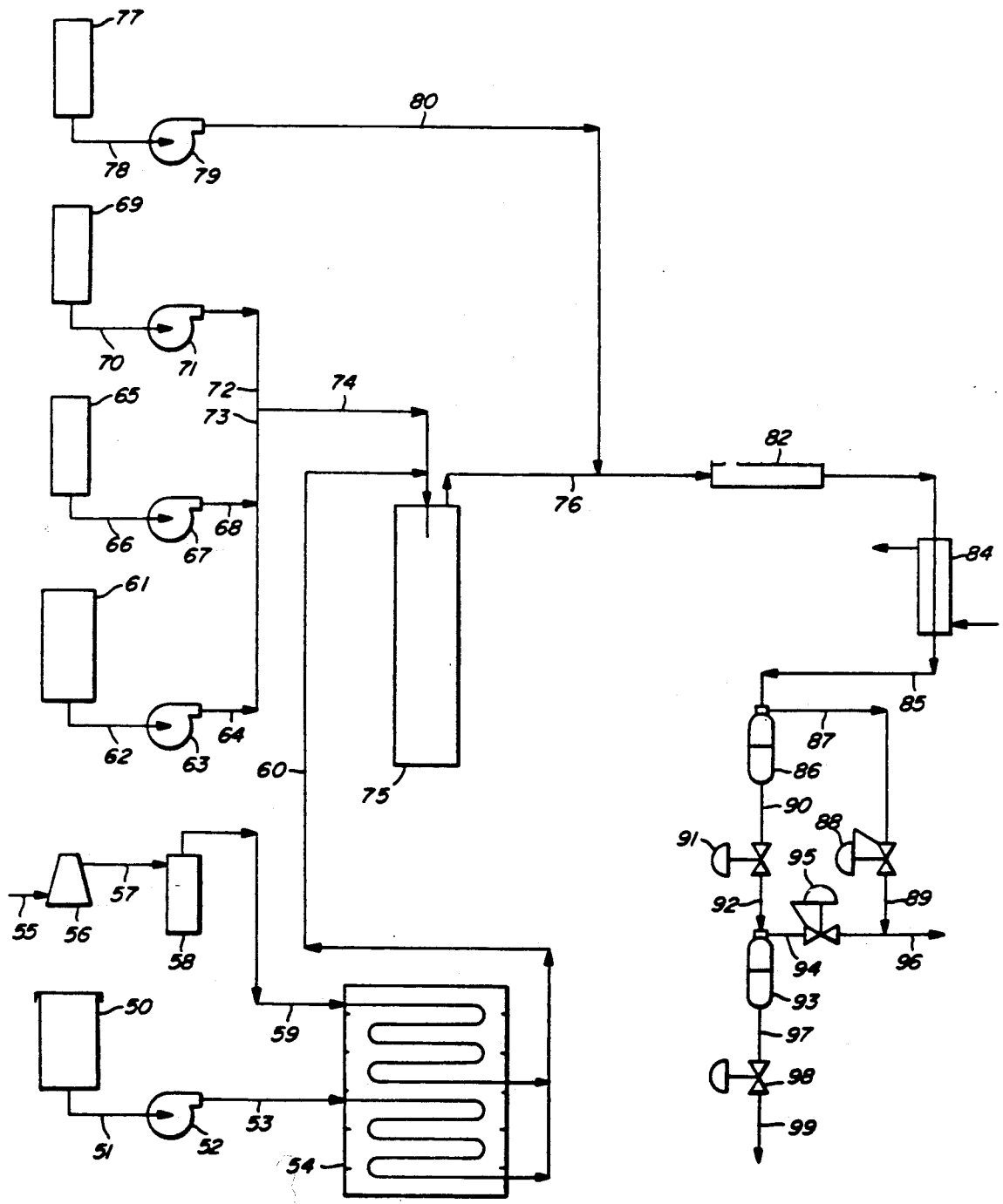
FIG. 4 depicts an apparatus used to conduct certain experiments discussed in the examples.

Two experiments were carried out to oxidize isopropanol in a supercritical temperature water oxidation system over a range of supercritical and subcritical pressures. FIG. 4 is a schematic of the unit used for this work. The high pressure pumps and oxidant compressor are on the left side of the diagram. The oxidant compressor 56 can be operated with room air or with gas supplied directly from cylinders. Deionized water is pumped up to system pressure by the water pump 52 and passed through superheater 54 to bring it to a supercritical temperature. This water is mixed with oxidant, which has also been pressurized and preheated, and the combined stream is then injected through line 60 into the first stage reactor/solids separator.

Waste feed, fuel and caustic, if used, are pumped up to pressure separately through pumps 63, 67 and 71. No feed preheating is carried out on this apparatus. The feed, fuel and caustic are mixed in line 74 and injected into the first stage reactor/solids separator 75 where they contact the oxidant/supercritical temperature water stream, initiating a rapid reaction. Inorganic solids precipitate from the supercritical fluid, impinge on the walls and settle to the reactor bottom. The particle-free fluid leaves the first stage reactor/solids separator through line 76 and passes to a second stage plug flow reactor 82 to ensure adequate residence time. Auxiliary fuel is sometimes added via pump 79 near the inlet of the second stage reactor to offset heat losses or achieve a higher temperature than in the first stage.

The fluid stream exits the second stage reactor and passes through a cooldown exchanger 84 where a two-phase mixture of gas and liquid forms as the temperature becomes subcritical. The phases are separated in a high pressure liquid/vapor separator 86 which operates at system pressure. The gas stream pressure is reduced to near ambient through valve 88, while the liquid stream is reduced to about 7 bar pressure through valve 91, leading to the further evolution of gas (mostly $CO_2$) in line 92. This two-phase stream then enters a low pressure liquid/vapor separator 93. The liquid stream exiting this vessel through line 97 and valve 98 is sampled or disposed of, while the gas stream leaving the vessel through line 94 and valve 95 mixes with the gas stream from the high pressure separator in line 89 and is sampled or vented. After an experiment, the first stage reactor/solids separator 75 is opened and any accumulated solids are removed.

When operating the unit of FIG. 4 under supercritical water oxidation conditions, it has been found that carbon monoxide in the gaseous effluent is the most sensitive indicator of oxidation efficiency. CO is typically the last remaining product of incomplete combustion, and is the first compound to be observed at increased levels if oxidation is non-optimum. For this reason, the CO in the gaseous effluent was used as a measure of oxidation rate in the two experiments described here. Auxiliary fuel was not used for the tests described here, and as a result little reaction would be expected to occur in the relatively low temperature second stage reactor.

Figure 5:
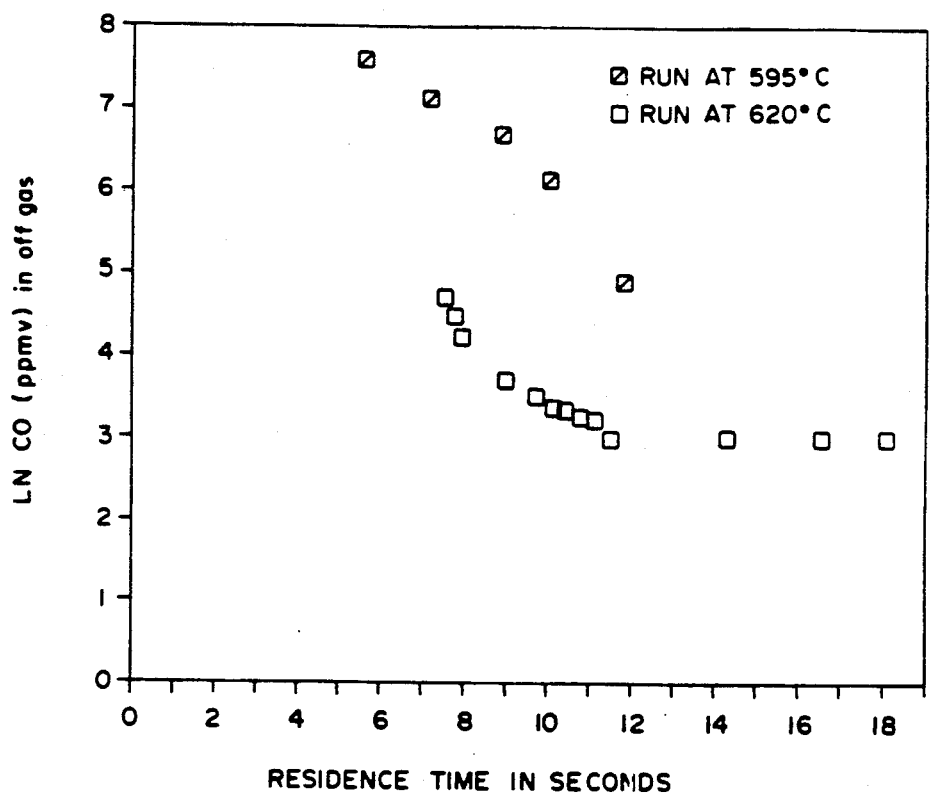
FIG. 5 shows the effect of operating pressure, expressed as the residence time in a constant volume vessel, on CO oxidation rate.

Table 2 shows the results of the two experiments, the first at an average first stage reactor temperature of 620° C. and the second at an average first stage reactor temperature of 595° C. For both tests, system operating pressure was reduced in several steps. CO was expected to rise as pressure was decreased due to the lower fluid density and therefore reduced reactor residence time. For the 620° C. experiment the CO level remained constant at 20 ppm down to a pressure of 172 bar (2500 psi), corresponding to a residence time of about 11.5 seconds in the first stage reactor. As pressure was decreased further, CO rose at a somewhat increasing rate. This is illustrated in FIG. 5, which is a plot of the natural logarithm of CO concentration versus reactor residence time. For an oxidation first order in CO (an assumption supported at supercritical pressures by the work of R. K. Helling and J. W. Tester, *Energy Fuels*, 1987, 1, 417), this plot should be a straight line. The steeper slope at the three lowest residence times could be taken as an indication of a changing reaction mechanism. It is considered more likely, however, that this is an artifact of altered reactor flow patterns at the lower pressures.

TABLE 2

| | CO Oxidation Kinetics | | |
|---|---|---|---|
| P (psia) | P (bar) | Effluent CO (ppm) | Sec. Res. Time |
| Experiment 1: T = 620° C. | | | |
| 3753 | 259 | 20 | 18.1 |
| 3500 | 241 | 20 | 16.6 |
| 3000 | 207 | 20 | 14.3 |
| 2500 | 172 | 20 | 11.5 |
| 2400 | 165 | 25 | 11.2 |
| 2350 | 162 | 26 | 10.6 |
| 2250 | 155 | 28 | 10.5 |
| 2200 | 152 | 29 | 10.2 |
| 2100 | 145 | 33 | 9.8 |
| 1950 | 134 | 40 | 9.0 |
| 1750 | 121 | 68 | 8.0 |
| 1700 | 117 | 87 | 7.8 |
| 1650 | 114 | 110 | 7.6 |
| Experiment 2: T = 595° C. | | | |
| 2034 | 140 | 134 | 11.9 |
| 1735 | 120 | 456 | 10.1 |
| 1545 | 107 | 802 | 8.9 |
| 1269 | 67 | 1222 | 7.2 |
| 998 | 69 | 1978 | 5.7 |

At 595° C., as expected, CO levels are higher than at 620° C. for a given reactor residence time. This is shown in Table 2 and FIG. 5. The rough linearity of the data in FIG. 5, as well as the observation of stable reactor temperatures indicates that the reaction is self-sustaining at 70 bar (1000 psi), the lowest pressure tested. Measurements were discontinued at this point as the infrared CO meter had exceeded its range of 2000 ppm. It is clear, however, that for certain feeds pressures below 70 bar will provide efficient oxidation at residence times considerably less than a minute. It should also be pointed out that use of a plug flow reactor at identical residence times would yield considerably lower CO values than those shown in Table 2.

U.S. Pat. No. 3,804,756 to Callahan, et al., indicates that catalysts are required for oxidation at near atmospheric pressure in the supercritical temperature range. It is thus believed that pressurization to at least about 25 bar is necessary to increase reactant concentrations sufficiently to allow self-sustaining combustion without a catalyst.

It should be noted that the role of water in these oxidation reactions is unclear. It is known that amounts of water up to at least 18 mole percent increase the oxidation rate of CO in conventional combustion (Howard. J. B., G. C. Williams and D. H. Fine, "Kinetics of Carbon Monoxide Oxidation in Postflame Gases", 14th Symp. (Int.) on Combustion (Proc.)1973, 975). Under supercritical water oxidation conditions, Helling and Tester's results (1987) indicate that water slows the oxidation rate.

EXAMPLE 4

In U.S. Pat. No. 4,380,960, Dickinson teaches that alkali catalyst is necessary to achieve efficient combustion at supercritical (with respect to water) temperatures and a wide range of subcritical and supercritical pressures. An experiment was carried out to test this hypothesis by comparing the oxidation of isopropanol with and without the presence of sodium hydroxide. As in Example 3, the level of CO in the gaseous effluent was used as a measure of oxidation efficiency. At reactor conditions of 15.7 bar (2030 psi) and 576° C., CO was 220 ppm without NaOH. At these same conditions, caustic was included in the feeds to the reactor to yield a reactor concentration of about 700 ppm NaOH. CO in the gaseous effluent rose and steadied at about 500 ppm.

In a second experiment, a mixture of coal and isopropyl alcohol was oxidized in the apparatus of FIG. 4, with and without the presence of alkali (as sodium hydroxide). The experimental conditions and results are given in Table 3. No second stage reactor fuel was used, so that any reaction occurring within the second stage reactor would be of minor significance. The amount of alkali added for the second part of the experiment was determined by the level of sulfate in the liquid effluent in the first (no alkali) part of the experiment. This amount was somewhat in excess of that needed to neutralize the first part effluent sulfate.

Conditions within the first stage reactor were deliberately set to give slightly incomplete oxidation, in order to allow comparison between the two cases. As shown in Table 3 by the high organic carbon destruction efficiency, oxidation was very nearly complete in both cases. The small magnitude of the changes in the gas effluent CO and liquid effluent organic carbon make it difficult to ascribe the changes to the presence of alkali or some other minor difference.

TABLE 3

Effect of Alkali on Coal/IPA Oxidation

| | No Alkali | Alkali |
|---|---|---|
| Reactor Inlet Concentration, mg/kg | | |
| Coal | 8900 | 10700 |
| IPA | 6700 | 6700 |
| Added NaOH | 0 | 290 |
| 1st Stage Reactor Temperature, °C. | 577 | 577 |
| System Pressure, bar | 207 | 207 |
| Residence Time, seconds | 26 | 26 |
| Oxidant | air | air |
| $O_2$ in effluent gas, mol % | 10.4 | 7.5 |
| CO in effluent gas, ppm | 135 | 153 |
| Organic carbon in effluent liquid, ppm | 1.2 | 0.7 |
| Sulfate in effluent liquid, ppm | 226 | 20 |
| Estimated organic carbon destruction efficiency, % | 99.992 | 99.996 |

Clearly, alkali catalyst is not a general requirement for rapid and efficient reaction at supercritical temperatures, as would be inferred from U.S. Pat. No. 4,380,960.

EXAMPLE 5

As previously described, salts are separated in the apparatus of FIG. 4 by a combination of gravity and impingement upon the walls of the first stage reactor/solids separator. This separation is not perfectly efficient; typically a few percent of the solids present remain entrained in the fluid stream. For certain types of solids, this will lead to rapid plugging of the small diameter lines used in the system once the first stage reactor has been exited. To avoid premature shutdown from this cause, a filtering device has been developed to prevent particulate carryover. An experiment was carried out with a 2 wt. % NaCl, 1 wt. % $Na_2SO_4$ feed at both subcritical and supercritical pressures to allow a comparison of solids separation and filter behavior. Table 4 summarizes the test conditions and results. After 41 minutes at 234 bar operating pressure, a differential pressure of 2 bar had built up across the filter due to solids deposition. This is an indication that the unit would soon have to be taken off line and the filter cleaned. In contrast, when operating at 138 bar system pressure, differential pressure across the filter only increased by 0.2 bar after 2 hours. It is believed that the lower pressure favorably affected the properties of salt on the filter by avoiding solid "melting". In other words, at lower partial pressures of water there is less tendency for the water to dissolve the salts to form a concentrated brine or melt. This discovery is of crucial importance to the operation of various solids separation schemes.

TABLE 4

Destruction of Model Salt-Containing Waste at Subcritical and Supercritical Pressures

| | Run 418A | Run 418B |
|---|---|---|
| Feed, wt. % | $H_2O$-86.5, $iC_3H_8$-10.8, NaCl-1.8, $Na_2SO_4$-0.9 | |
| Reactor P, bar | 234 | 138 |
| Reactor Temp., °C. | 584 | 580 |
| Residence Time, seconds | 16 | 16 |
| Oxidant | air | air |
| Excess $O_2$, % stoichiometric | 50 | 43 |
| Time to 2 bar (30 psi) across filter | 41 min. | >2 hrs. |

EXAMPLE 6

Figure 6:
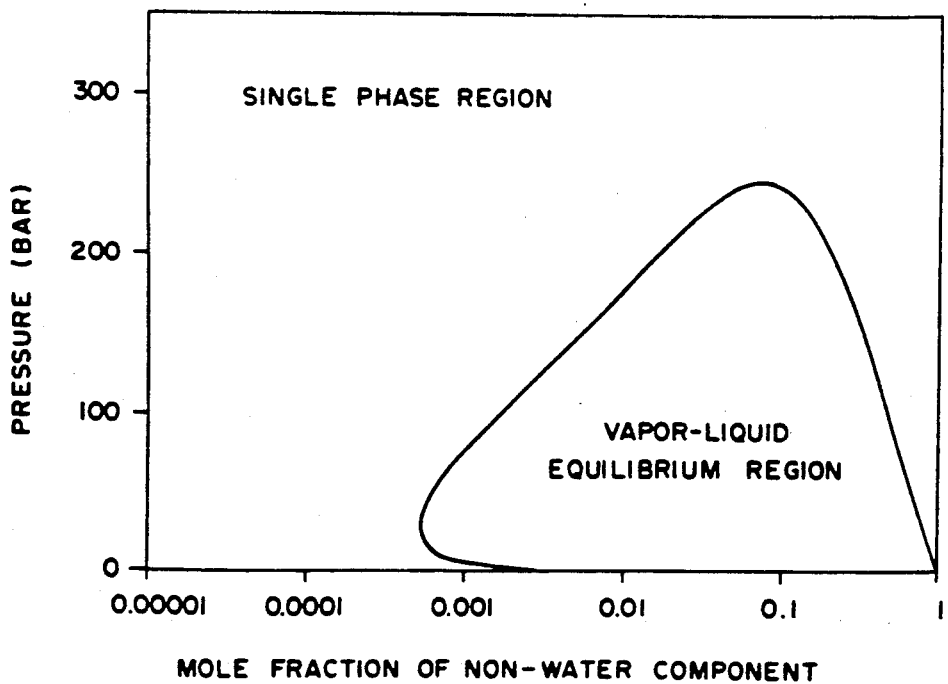
FIG. 6 shows a typical vapor-liquid equilibrium curve at a supercritical temperature.
Figure 2:
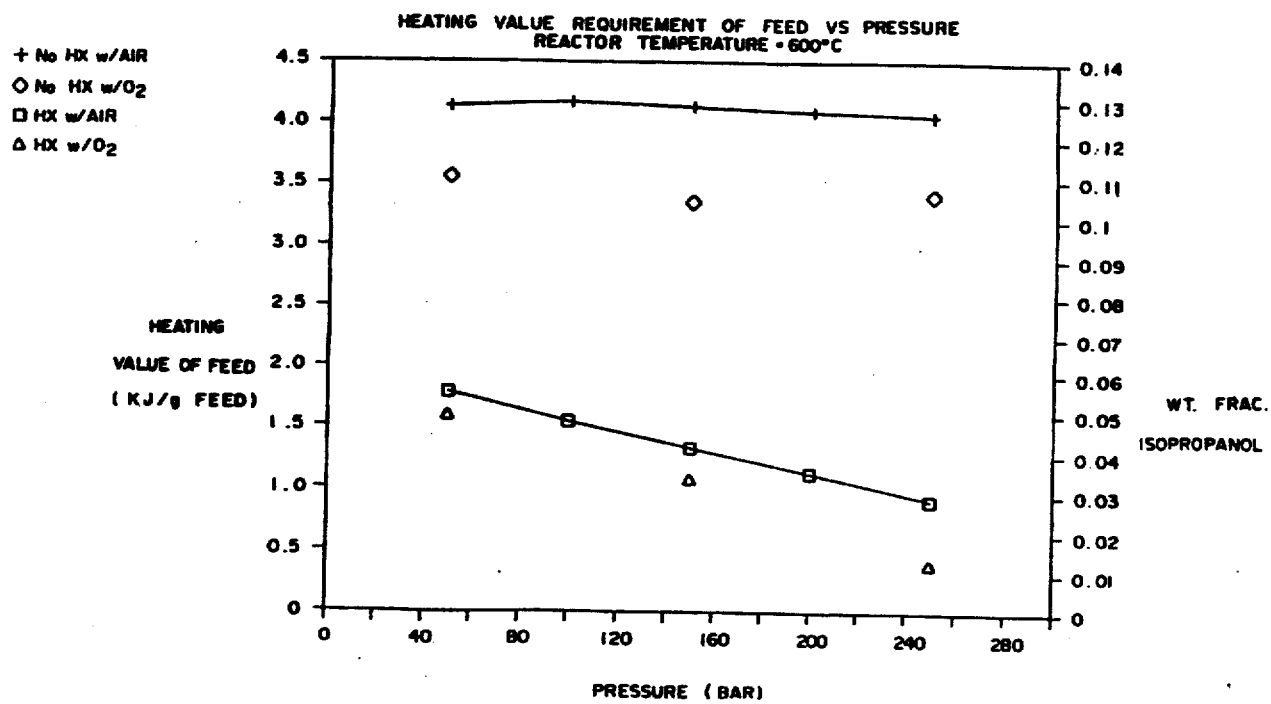

In some cases the subcritical pressure oxidation will be preferred to a supercritical pressure oxidation because of a favorable vapor-liquid equilibrium condition. FIG. 6 gives an example of one type of binary (two chemical components) phase behavior which is likely to occur at a temperature supercritical with respect to water. The amount of the non-water component is shown on the horizontal axis while pressure is varied along the vertical axis. The single-phase and two-phase vapor-liquid regions are separated by the curve envelope shown. Within the two-phase region the endpoints of a horizontal line will intersect the curve envelope at two points. The left endpoint gives the vapor composition while the right endpoint shows the liquid composition of the coexisting phases. Note that at supercritical pressures (>221 bar) vapor-liquid equilibrium is attainable over only a very limited range of compositions. Furthermore, the liquid and vapor compositions are fairly similar, each containing a significant amount of both components. Component separation is considerably easier at subcritical pressures, as the vapor-liquid equilibrium region covers a much wider composition range. Now the liquid phase is greatly enriched in the non-water component, and the vapor phase is greatly enriched in water. For this reason, supercritical temperature water oxidation might be preferred over supercritical water oxidation in this application. Only very limited phase equilibrium data are available in the pressure and temperature range of interest, and the actual shape of the phase regions are known for only a few compounds. It is believed, however, that behavior similar to that illustrated in FIG. 6 will be observed for mixtures of water with compounds which have a melting point less than about 600° C. and a boiling temperature greater than that of water. Important examples of such compounds are sodium hydroxide, sulfuric acid, and ammonium sulfate Many other embodiments and applications may be envisaged without departing from the scope of this invention. Variations on the process flow scheme might include:

(a) recycle a portion of the reactor effluent to provide preheating;

(b) inorganic removal as a slurry or solution, rather than as dry solids;

(c) various other reactor types, for example, packed bed or fluidized bed;

(d) use of less than stoichiometric oxygen when partial combustion is desired;

(e) a discrete portion of the apparatus providing for organic reforming;

(f) use of multiple reactors;

(g) use of oxygen containing gases other than air;

(h) use of contaminated gas as or in addition to the oxidant, to allow purification of gas and/or liquid streams;

(i) use of oxidants other than or in addition to those containing gaseous $O_2$, for example, hydrogen peroxide, ozone, nitric acid or nitrates, nitrites, nitrous oxide, perchlorate, etc.;

(j) treatment of streams which do not require the addition of supplemental oxidant, for example ammonium perchlorate;

(k) introduction of oxidant gas upstream of the heat exchanger to help avoid fouling;

(l) coupling of the air compressor to an expander operated by a process effluent; or (m) a batch mode of operation.

The process is suited to a wide variety of feeds, including the following:

(a) liquid, gaseous and solid organics;

(b) coal;

(c) activated carbon;

(d) manufactured polymeric materials;

(e) sewage;

(f) fly ash;

(g) toxic and hazardous chemicals;

(h) soils or sediments contaminated with toxic compounds;

(i) industrial/chemical plant effluents;

(j) brines;

(k) animal waste and byproducts, e.g., manure, tannery and slaughterhouse effluents;

(l) plants, plant waste and byproducts, e.g., peat, corn stover, chaff, bagasse, wood waste, pulp and paper mill effluents;

(m) streams containing microorganisms or their byproducts; or (n) inorganics with COD, e.g., ammonia, hydrogen, carbon monoxide, cyanides.

In some cases, these feeds will be introduced as is, while in others they will be mixed with other constituents.

I claim:

1. A non-catalytic, self-sustaining method for substantially completely oxidizing combustible materials in which an aqueous stream bearing the combustible materials is reacted in the presence of an oxidant at a temperature greater than the critical temperature of water and at a pressure between about 25 bar and the critical pressure of water within a reactor for a period of less than about 5 minutes to produce a reaction product stream.

2. The method of claim 1, further comprising removing inorganic constituents from the reaction product stream.

3. The method of claim 2, wherein the inorganic constituents are in the form of particles.

4. The method of claim 2, wherein the inorganic constituents are in liquid form.

5. The method of claim 1, further comprising obtaining useful energy from the reaction product stream.

6. The method of claim 1, further comprising introducing a cation source to the reactor to neutralize inorganic anions.

7. The method of claim 1, wherein the destruction efficiency of the combustible materials is greater than about 99.0%.

8. The method of claim 1, wherein the oxidant is selected from the group consisting of air, oxygen, oxygen-containing gas, hydrogen peroxide, ozone, nitric acid and perchlorate.

9. The method of claim 1, wherein the reaction is a batch operation.

10. The method of claim 1, wherein the reaction is a continuous operation.

11. The method of claim 1, wherein the reactor is a deep well configuration.

12. A non-catalytic, self-sustaining method for achieving a destruction efficiency of greater than about 99.0% for combustible materials by bringing an aqueous stream bearing the combustible materials in the presence of an oxidant at a temperature greater than the critical temperature of water and at a pressure between about 25 bar and the critical pressure of water within a reactor for a period of less than about 5 minutes to produce a reaction product stream, and removing non-combustible inorganic constituents from the reaction product stream.

13. The method of claim 12, wherein the inorganic constituents are in the form of particles.

14. The method of claim 12, wherein the inorganic constituents are in liquid form.

15. The method of claim 12, wherein the inorganic constituents are in the form of both particles and liquid.

16. The method of claim 12, further comprising obtaining useful energy from the reaction product stream.

17. The method of claim 12, further comprising introducing a cation source to the reactor to neutralize inorganic anions.

18. The method of claim 12, wherein the oxidant is selected from the group consisting of air, oxygen, hydrogen peroxide, ozone, and nitric acid and perchlorate.

19. The method of claim 12, wherein the reaction is a batch operation.

20. The method of claim 12, wherein the reaction is a continuous operation.

21. A non-catalytic, self-sustaining method for oxidizing combustible materials in a reactor comprising:
introducing a continuous aqueous feed stream containing the combustible materials into the reactor;
reacting the feed stream in the presence of an oxidant at a temperature greater than the critical temperature of water and at a pressure between about 25 bar and the critical pressure of water for a residence time of less than about 5 minutes;
destroying at least 99.0% of the combustible materials during said residence time to produce a reaction product stream;
removing non-combustible inorganic constituents from the reaction product stream; and
obtaining useful energy from the reaction product stream.

22. A non-catalytic, self-sustaining method for substantially completely oxidizing materials in which an aqueous stream bearing oxidizable materials is reacted with an oxidant at a temperature greater than the critical temperature of water and at a pressure between about 25 bar and the critical pressure of water to produce a reaction product stream, and removing non-combustible inorganic constituents from the reaction product stream, including those which are highly soluble in liquid water below 374° C.

23. The method of claim 22 wherein the inorganic constituents are in the form of particles.

24. The method of claim 22 in which the reaction is carried out in a deep well reactor.

25. A non-catalytic, self-sustaining method for removing dissolved noncombustible inorganic materials from water comprising:
introducing an aqueous feed stream containing dissolved noncombustible inorganic materials to a reactor;
introducing combustibles to the reactor as a separate stream or as a constituent of the aqueous feed stream;
reacting the combustibles in the presence of an oxidant at a temperature greater than the critical temperature of water and at a pressure between about 25 bar and the critical pressure of water; and
removing noncombustible inorganic constituents from the hot reaction product stream, including those originally dissolved in the aqueous feed stream.

* * * * *

UNITED STATES PATENT AND TRADEMARK OFFICE
CERTIFICATE OF CORRECTION

PATENT NO. : 5,106,513
DATED : April 21, 1992
INVENTOR(S) : Glenn T. Hong

It is certified that error appears in the above-indentified patent and that said Letters Patent is hereby corrected as shown below:

The drawing sheet, consisting of Fig. 2, should be deleted to be replaced with the drawing sheet, consisting of Fig. 2, as shown on the attached page.

Signed and Sealed this

Seventeenth Day of January, 1995

Attest:

BRUCE LEHMAN

Attesting Officer — Commissioner of Patents and Trademarks